No. 848,101. PATENTED MAR. 26, 1907.
H. S. HALE.
APPARATUS FOR SUPPLYING FOOD TO FISH AND LAND ANIMALS.
APPLICATION FILED FEB. 28, 1903.
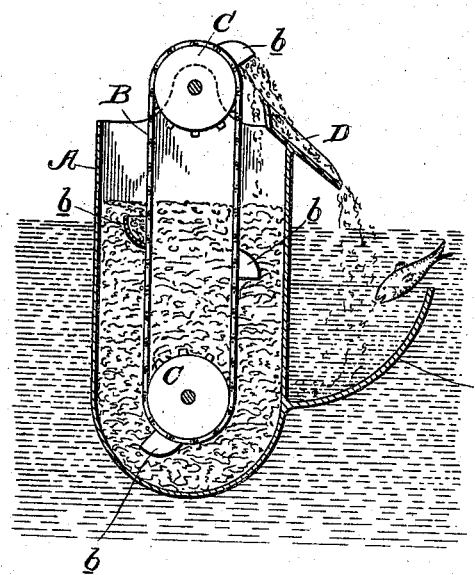
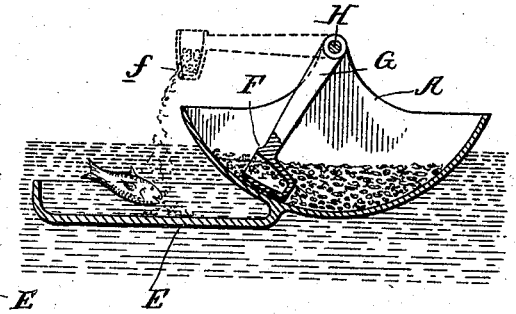
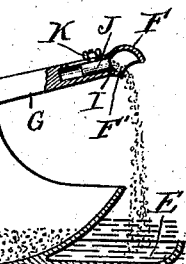
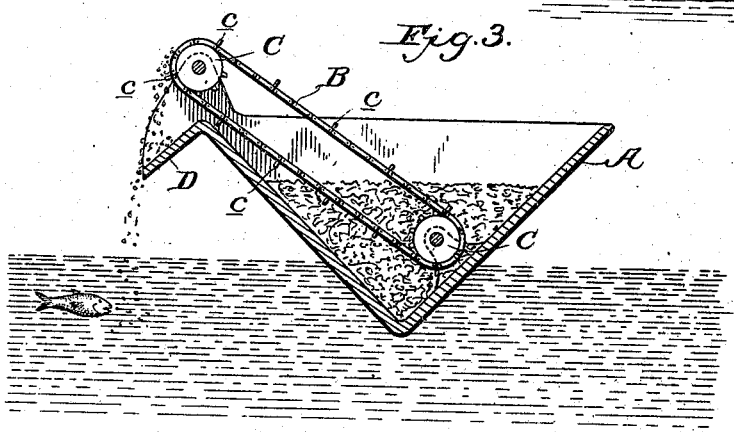
Witnesses
E. C. Wurdeman
G. M. Kelly
Inventor
Henry S. Hale
By [signature]
Attorney
THE NORRIS PETERS CO., WASHINGTON, D. C.

UNITED STATES PATENT OFFICE.

HENRY S. HALE, OF PHILADELPHIA, PENNSYLVANIA.

APPARATUS FOR SUPPLYING FOOD TO FISH AND LAND ANIMALS.

No. 848,101.  Specification of Letters Patent.  Patented March 26, 1907.

Application filed February 28, 1903. Serial No. 145,463.

*To all whom it may concern:*

Be it known that I, HENRY S. HALE, of the city and county of Philadelphia, State of Pennsylvania, have invented an Improvement in Apparatus for Supplying Food to Fish and Land Animals, of which the following is a specification.

My invention relates to apparatus for supplying feed to fish and land animals, and is fully set forth in the following specification and shown in the accompanying drawings.

In feeding fish, poultry, &c., it is especially desirable that a uniform quantity of feed should be supplied in a given period of time. In large fish and poultry hatcheries much time and labor are consumed in supplying the feed, and a uniform supply cannot be obtained under present methods without constant care and attention on the part of the attendants. In pisciculture especially great care must be exercised, and the quantity as well as the character of the feed must be regulated to suit the size and species of the young fish.

It is the object of my invention to provide mechanical devices for supplying the feed at the feeding beds or inclosures without requiring the constant attention of the attendants.

It is also an object of my invention to provide an apparatus which when supplied with a quantity of feed of the proper quality will supply the same in predetermined and uniform quantities. Such apparatus may be operated by hand to supply a measured quantity of feed at given intervals or may be driven by suitable power devices to maintain a uniform supply of feed in measured quantities and at uniform intervals without requiring any attention from the attendants except to see that the feed-supply in the apparatus is not exhausted.

In fish feeding it is desirable that the feed supplied to the water should not be allowed to fall to the bottom of the feeding-bed, and for this purpose I provide a submerged catch pan or basin to receive such feed as falls without being taken by the fish. Such feed as accumulates in the pan or basin is not lost, but may be recovered therefrom and used over again.

In carrying out my invention I employ a suitable vessel to contain a quantity of the feed, in combination with a moving conveyer arranged to travel through the vessel and elevate and discharge the feed therefrom. By providing the conveyer with a suitable measuring device a predetermined quantity of feed may be supplied at each operation and a uniform supply may be obtained in a given interval of time. The feed supplied may be of any suitable character, that used in pisciculture usually being mixed with water.

For purposes of illustration I have shown my invention as especially employed for fish feeding; but I do not mean thereby to limit myself to such use of my invention, as it may obviously be employed for feeding poultry, &c.

My invention is shown in the accompanying drawings, in which—

Figures 1, 2, and 3 are vertical sectional views of a feed measuring and supplying apparatus embodying my invention and each illustrating a different form thereof.

Referring first to Fig. 1, A is a vessel adapted to contain a quantity of feed. B is an endless traveling conveyer passing through the body of the feed in the vessel A. As shown, this conveyer consists of an endless chain passing over sprocket-wheels C C, to one of which power may be applied in any convenient manner. *b* are buckets carried by the chain. As the conveyer B travels each bucket *b* will successively take a measured quantity of feed from the vessel A, which it discharges upon reaching the top. A trough or guide D may be arranged at the top of the vessel A to receive the feed discharged by the buckets and guide it outside of the vessel A. A pan or basin E may be arranged below the trough or guide D to receive the feed as it falls. When the apparatus is used for feeding fish, it may be partially submerged in the water, as shown.

In the construction shown in Fig. 2 instead of the endless chain-and-bucket conveyer shown in Fig. 1 a bucket F, carried by an arm G on a shaft H, is employed. The arm G may be either rotated or rocked so as to cause the bucket to successively enter the feed in the vessel A and rise therefrom. By providing an opening *f* in the bucket the feed may be permitted to escape therefrom when the arm G is raised.

In the construction shown in Fig. 3 the conveyer consists of an endless chain passing over sprocket-wheels, but instead of buckets small plates or bars *c* are employed. As in the construction shown in Fig. 1, a guide or trough D may be used. The conveyer may be operated from time to time by hand-power or may be driven by suitable power devices, in which case the conveyer should be run at a very low speed, or otherwise an excess of feed will be supplied.

The construction in Fig. 4 is similar to that shown in Fig. 2, except that in this case the bucket F is in the form of a scoop or spoon having a cover or guard F' extending from the back, and the arm G makes a complete revolution about its axis H. After the arm reaches a more or less upright position the feed in the scoop or spoon is retained by the guard F' until the arm sweeps through its descending arc, when the feed drops from the scoop. The edge of the receptacle A must not be extended on the discharging side far enough to intercept the feed in its descent. To enable the bucket or receptacle F to be adjusted as to size, so as to vary the quantity of feed delivered at each rotation of the arm G, the scoop or bucket may be formed with an extension or continuation I extending into the arm, in which is arranged an adjustable plug J, which may be adjusted longitudinally, as by the screw and slot K, to open the extension or continuation I to a greater or less extent.

The details of construction shown may be varied without changing the invention.

Having now described my invention, what I claim as new, and desire to secure by Letters Patent, is—

1. In apparatus for supplying feed in measured quantities, the combination of a vessel to contain a quantity of feed, a moving conveyer having a measuring and discharging device arranged to travel through the feed in the vessel and having a continuous motion while in operation to remove and automatically discharge a measured quantity of feed with each completed movement, said measuring device being adjustable to regulate the measured quantity of feed discharged with each completed movement.

2. In apparatus for supplying feed in measured quantities, the combination of a vessel to contain a quantity of feed, a traveling arm having a continuous movement and provided with a scoop which travels through the feed with each completed movement of the arm and removes and automatically discharges a measured quantity of feed, and means to adjust the capacity of said scoop.

In testimony of which invention I have hereunto set my hand.

HENRY S. HALE.

Witnesses:
 MAUD HUNTER,
 R. M. KELLY.